Feb. 9, 1954 H. W. AUGUSTADT ET AL 2,668,874

AUTOMATIC VOLUME CONTROL

Filed Jan. 10, 1950 2 Sheets-Sheet 1

INVENTORS H. W. AUGUSTADT
W. F. KANNENBERG

BY D. MacKenzie

AGENT

INVENTORS H. W. AUGUSTADT
W. F. KANNENBERG

BY D. MacKenzie

AGENT

UNITED STATES PATENT OFFICE 2,668,874

AUTOMATIC VOLUME CONTROL

Herbert W. Augustadt, Westfield, and Walter F. Kannenberg, Gillette, N. J., assignors to Bell Telephone Laboratories, Incorporated, New York, N. Y., a corporation of New York Application January 10, 1950, Serial No. 137,732

7 Claims. (Cl. 179—1)

This invention relates to an improved apparatus for the automatic volume control of a sound program reproduced in a noisy listening area, where the reproduction of program selections alternates with intervals of no program. During such an interval, the apparatus of the present invention operates so to adjust the gain of the reproducing system that the next succeeding program selection shall be heard at a level satisfactorily related to the noise level during the preceding interval.

In the copending application of H. W. Augustadt, "Automatic Volume Control," filed September 17, 1949, Serial No. 116,397, assigned to the same assignee as the present invention, there is described a generically similar apparatus. Each is an "interval adjusting" system, meaning a program volume control adjusted in accordance with the noise level preceding the commencement of a program selection. However, the copending application referred to describes a system lacking means to prevent long blasts of noise in the interval of a no-program from driving the program gain unduly high should the noise level fall during the ensuing program rendition.

Such a result is made impossible by the present invention, in which a metering circuit prescribes the time during which automatic increase of program gain may take place, and so limits the gain increase permitted in any program interval. In the next such interval another gain increase may be made, if called for by the preceding noise level. The permitted gain change may be preselected. This limitation of the change in program gain is confined to the case of increase in gain: the metering circuit does not operate to limit the decrease in program gain which lowered noise level calls for; in a silent interval the gain setting may drop without limitation.

It is therefore the general object of the invention to provide an improved interval-adjusting system for the automatic control of gain in an electrical sound reproducing system.

It is another object of the invention to provide an interval-adjusting volume control system wherein program gain increase may take place only in a limited step during any one program interval, but gain decrease follows the decrease in noise level during such an interval.

Another object of the invention is to provide an interval-adjusting system including regulation of the permitted gain increases in the intervals between sound programs.

In the copending application referred to, the electrical apparatus described involves a lag in the gain adjustment analogous to the backlash in mechanical systems. Such a lag is made harmless by the present invention, inasmuch as provision is made for approaching the readjusted program gain setting always from a position of minimum gain in the no-program interval, and this attains another object of the invention.

The invention will be described with reference to the accompanying drawings in which.

Figure 1:
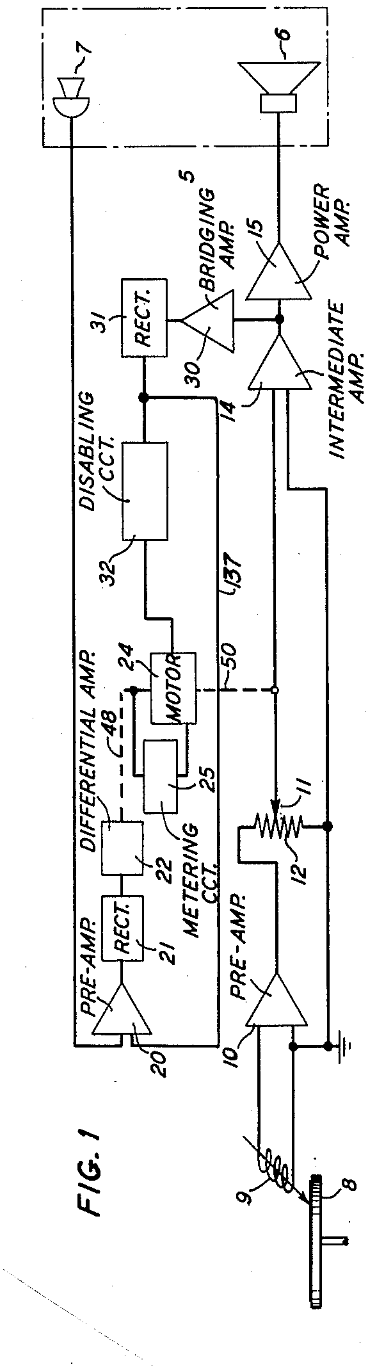
Fig. 1 is a block schematic of the complete system.

Referring now to Fig. 1, the block diagram shows in listening area 5 loudspeaker 6 and microphone 7. A sound program from disc 8, for example, is transformed by conventional pick-up 9 into a voltage which is amplified by preamplifier 10. A portion of the output of amplifier 10, chosen by initially manual but ultimately automatic adjustment of brush 11 on potentiometer 12, is passed to the intermediate amplifier 14 and power amplifier 15, the output of which drives loudspeaker 6.

In the listening area, microphone 7 is always active to pick up program sound, or noise, or both, but is effective, as will later appear, to control the setting of brush 11 only during intervals of no program. The output of microphone 7 is amplified by preamplifier 20 followed by rectifier 21. The rectifier output is applied to differential amplifier 22 which in turn prescribes the operation of motor 24 to adjust brush 11 on potentiometer 12. Schematically, metering circuit 25 is indicated adjacent motor 24; its function is to halt motor 24 when gain control brush 11 has varied by the chosen limited amount the gain of the program system between pick-up 9 and loudspeaker 6.

To provide for disabling motor 24 and also preamplifier 20 when the program rendition begins, there is provided push-pull bridging amplifier 30, the input of which is a high impedance across the output circuit of amplifier 14 in order that amplifier 30 shall not load the program channel. The output of amplifier 30 is rectified by rectifier 31 controlling disabling circuit 32; the latter interconnected with the circuit between differential amplifier 22 and motor 24 provides for disabling amplifier 20 and motor 24 when program power is present in the output circuit of amplifier 14.

On the cessation of a program selection, disabling circuit 32 is itself disabled and this restores the activity of preamplifier 20 and of the circuit controlling motor 24 so that noise during the succeeding interval is allowed to produce a new gain setting of brush 11.

The circuit operation above outlined enables the gain of the program channel at the end of a program to rise, if demanded by the noise level succeeding the program, through a prescribed amount and no more. The new gain setting is maintained throughout the next program and may again be adjusted during the next interval of no program. Should the noise level in a program interval fall below that in the preceding interval, the program channel gain is allowed to drop accordingly without limitation.

Preferably, preamplifier 20 is adjusted to make substantially equal the rectified voltages from rectifiers 21 and 31, when the noise level in a program interval is comparable with the ensuing program level. The microphone channel does not require high fidelity and its components may be as simple as desired.

Microphone 7, which may be a permanent magnet speaker followed by step-up transformer 34, is coupled to preamplifier 20 comprising tubes V1 and V2, suitably pentodes such as the 6SH7 in a conventional tandem connection. The grid leak of tube V2 includes a potentiometer 35 in series to ground with a fixed resistor 135 provided for disabling tube V2. Tubes V1 and V2 are normally conducting, but during the rendition of a program selection there appears across resistor 135 a rectified voltage negative to ground which cuts off tube V2.

The output of tube V2 is rectified by oppositely poled varistors 36 and 37 shunted by resistor 38. Of these varistors the former may suitably comprise eight one-sixteenth inch Chile copper oxide pellets; the latter fifteen thallium copper oxide pellets of the same size. Varistor 36 alone would yield a characteristic of rectified voltage versus microphone input level including the dashed portion 1 of Fig. 3, a characteristic which it is desired to taper at the higher levels. Varistor 37, connected as shown and proportioned as described to varistor 36, converts the characteristic to that shown in curve 2, and so reduces the sensitivity of the microphone channel at high noise levels.

Figure 3:
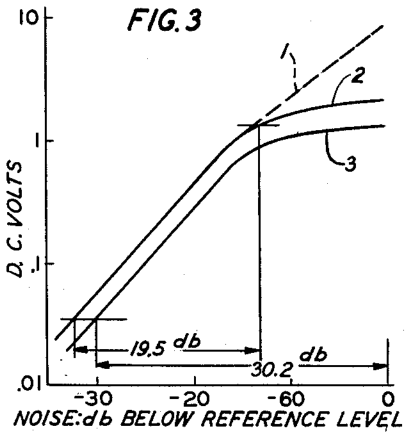
Fig. 3 shows curves exhibiting the tapering off at higher noise levels of the gain control voltage.

Only a desired fraction of the voltage characterized by curve 2, as shown by curve 3 of Fig. 3, need be supplied to differential amplifier 22 as its operating input. As hereinafter detailed, the decibel change in program level is conveniently given a linear relation to the change in differential amplifier input. With suitable scale change curve 3 of Fig. 3 may therefore be considered representative of the relation between noise level and resulting program level.

Justification for the shape of curves 2 and 3 of Fig. 3 is as follows: For low noise levels a change in noise of several decibels should cause only a slight change in program level; for noise levels comparable with the level at which program sound will be heard, the decibel steps in program gain and in noise level might suitably approach equality; for much higher noise levels it is preferable to reduce the relative change in program in order to avoid amplifier overload or inordinately high program level. The square law region of the rectifier characteristic provides the first relation, the linear portion the second, and the modified region the third.

Referring again to Fig. 2, varistors 36 and 37 and resistor 38 are shunted by resistor 39 and condenser 40 in series. While preamplifier 20 is operative, a rectified voltage representative of the noise in the listening area builds up a charge on condenser 40 and a suitable fraction of this voltage is through potentiometer 42 applied to the control grid of tube V3, which with tube V4 and their connections, constitutes differential amplifier 22 of Fig. 1. Tubes V3 and V4 may be the separate halves of a 12AU7.

When tube V2 is cut off by a negative voltage appearing across resistor 135, condenser 40 discharges through its associated resistors. The capacitance of condenser 40 may be chosen anywhere between 4 and 50 microfarads, and the resistances through which condenser 40 discharges after a program selection begins should be selected to provide a discharge time constant of less than one minute. This is to insure that the voltage across this condenser shall rapidly fall to a value less than matching the noise level to be dealt with in the next program interval, whereby the next adjustment increasing program gain is approached always in the same sense.

The cutting off of tube V2 when a new program selection begins is due to a rectified voltage obtained between amplifier 30 (tube V5 of Fig. 2) bridged across the program channel between amplifiers 14 and 15 of Fig. 1. A push-pull double triode V5, suitably a 12SN7, amplifies the voltage across the program line at the output of amplifier 14, and this voltage is rectified by rectifier 31. This is a voltage-doubling rectifier composed of cuprous oxide varistors 44 through which condensers 45 are charged to a voltage representative of the program level at the bridging point (input to tube V5).

Figure 2:
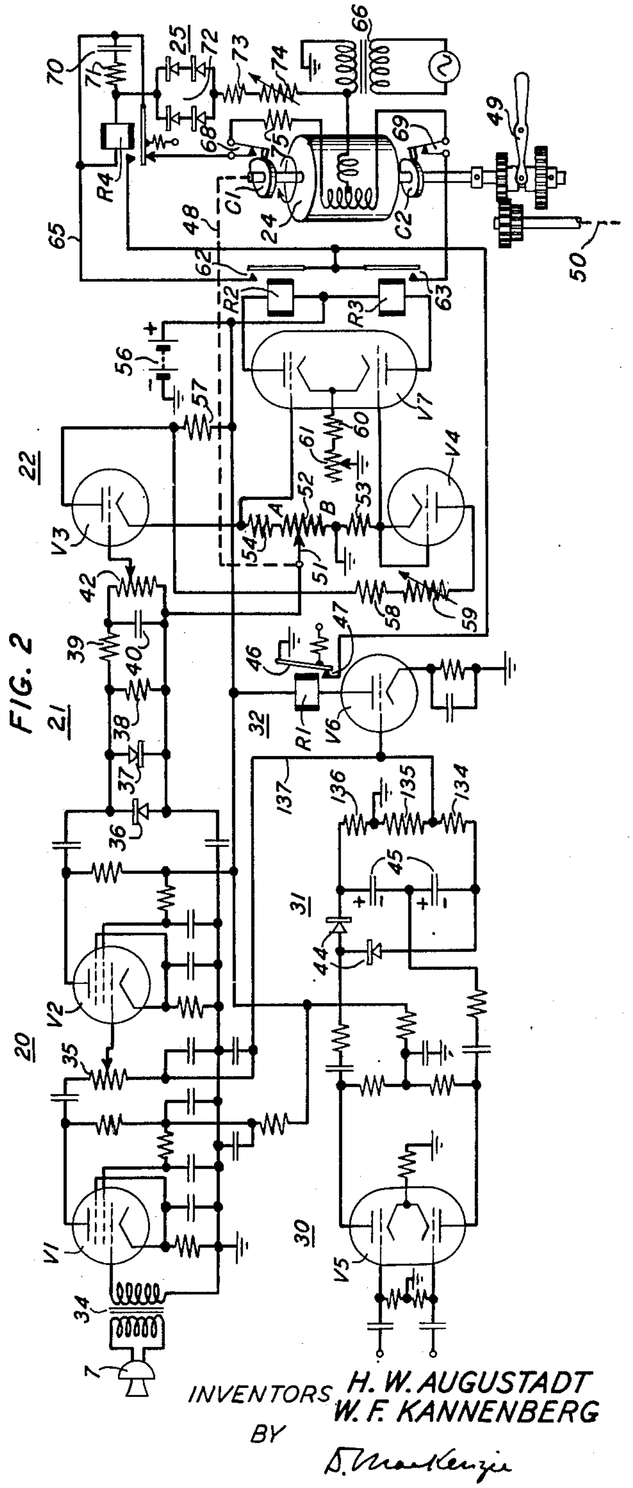
Fig. 2 is a circuit diagram of the interconnections between the program channel and the gain control channel of Fig. 1.

Condensers 45, in series, apply the rectified program representative voltage across resistors 134, 135 and 136 in series, the junction of resistors 135 and 136 being grounded. With the polarity of this voltage indicated in Fig. 2, there exists a voltage negative to ground at the junction of resistors 134 and 135; this voltage is applied via conductor 137 to bias to cut off both the control grid of tube V2 and that of tube V6. Tube V6, with relay R1 in its anode circuit, is normally conducting and constitutes disabling circuit 32 of Fig. 1. Armature 46 is grounded and when the winding of relay R1 is traversed by anode current of tube V6, contact 47 is likewise grounded. The situation represented by the showing of Fig. 2 is therefore that of a program gain adjustment during an interval of no program.

When the program ceases, condensers 45 discharge, tubes V2 and V6 regain conductivity and a control voltage appears at the grid of tube V3.

The features already described other than the shaping of curve 2, Fig. 3, and the control of program gain by the differential amplifier next to be described are disclosed, in generically the same manner as here, and are claimed in the mentioned copending application of H. W.

Augustadt. Modifications, as later described, are made in the motor operation for eliminating electrical backlash and limiting the gain increase allowed in any given program interval.

The shaft of motor 24 controls, through connections indicated by dashed lines 48 and 50, the settings of brush 51 on 1500-ohm potentiometer 52 and of brush 11 on potentiometer 12. Between the motor and the shaft connection 50 there is interposed the selector 49 by which may be selected a desired ratio between the motions of the brushes 11 and 51. Only two ratios are shown in the figure; obviously, any number may be provided. The mechanical connections are so arranged that when brush 51 moves from position A toward position B on potentiometer 52, brush 11 moves to increase the program gain; in Fig. 2, the downward motion of brush 51 accompanies an upward motion of brush 11 in Fig. 1.

The cathodes of tubes V3 and V4 are each grounded through 2000 ohms; this is the resistance of resistor 53, while 500-ohm resistor 54 is in series with potentiometer 52. The anode of tube V3 is supplied from battery 56 through 50,000-ohm resistor 57, while that of tube V4 is connected through 7500-ohm resistor 58 in series with 500-ohm rheostat 59 to the anode of tube V3. The grid and cathode of tube V4 are directly joined, and the cathodes of tubes V3 and V4 are connected to the control grids, respectively, of the twin triode V7, a 6SC7, the cathodes of which are jointly connected to ground through 1500-ohm resistor 60 and 500-ohm rheostat 61.

The anode circuits of tube V7 include, respectively, relays R2 and R3 of which the armatures are both connected to contact 47 and are also connected to the make contact of relay R4, the function of which will be stated later. Thus between program renditions, tube V6 is conducting, and when relay R1 is energized to close contact 47, ground is applied to the armatures of relays R2 and R3.

The initial circuit adjustment, when brush 51 is at the top or A end of potentiometer 52 and no noise voltage is applied to the grid of tube V3, is to set rheostat 59 until the currents in the windings of relays R2 and R3 are balanced. These are conventional plate circuit relays with reed type armatures, adjusted for the least possible difference between their release and operate currents. Adjustment of rheostat 61 is then made to provide that for relays R2 and R3 the equal currents shall be intermediate between operate and release values. This adjustment is independent of the condition of tube V6. The measurement of currents in the relay winding is made by conventional means, not shown.

Inspection of Fig. 2 shows that, so long as any current flows in tube V3, there is a negative bias voltage on the grid of V3 due to the voltage drop across resistor 54, and this negative voltage increases with downward motion of brush 51, connected to the negative plate of condenser 40. Tube V4 is connected as a diode, wherefore resistor 58 and rheostat 59 are introduced in series between the anode of this tube and 50,000-ohm resistor 57, to permit adjustment to equality of cathode voltages of tubes V3 and V4. This is the condition that obtains when rheostat 59 is adjusted to make equal the currents in the windings of relays R2, R3 provided the halves of V7 are alike. Obviously, the anode currents of tubes V3 and V4 are then equal, since the cathode resistors of these tubes are of equal resistance. The 50,000-ohm resistance of resistor 57 is large compared to the paralleled internal resistances of tubes V3 and V4; the supply of these tubes is therefore approximately at constant total current and change in the current of tube V3 is accompanied by an opposite change in the current of tube V4.

Such unbalance of anode currents comes about when a rectified positive voltage, due to noise, appears on the grid of tube V3, and balance can be reestablished by downward motion of brush 51. Such motion of brush 51 is accomplished by the activation of motor 24 and is accompanied by a motion of brush 11 to increase the program gain.

When during an interval of no program the noise voltage increases on the grid of tube V3, brush 51 being initially at the A position on potentiometer 52, the anode current in the cathode path of that tube similarly increases. Because the total current supplied from battery 56 to tubes V3 and V4 is practically constant, the anode current and so the cathode voltage of tube V4 decreases with increase in the corresponding quantities of tube V3, and to the same extent. These changes in cathode voltages are impressed on the respective grids of tube V7, increasing and decreasing respectively, the currents in the windings of relays R2 and R3.

Relay R2 now operates to close contact 62, while the current in relay R3 is now well below its operate value. Ground is applied via conductor 65 to the armature and back contact and to one terminal of the winding of relay R4, contact 47 being closed during the interval of no program. The other terminal of this winding is connected through metering circuit 25 to the secondary of transformer 66. It is obvious that a direct-current motor and voltage supply may be substituted for the alternating-current equipment shown in Fig. 2.

Ground is applied through the back contact of relay R4 and end-stop switch 68 to one of the stator windings in series with the rotor winding of motor 24, providing a current path from the secondary of transformer 66 through motor 24 to ground. The motor accordingly turns in a direction previously arranged to drive brush 51 downward on potentiometer 52 to a point thereon where approximate current balance of relays R2 and R3 is reestablished by the effect of the increased negative bias now applied to the grid of tube V3, as reflected through the cathode circuit of that tube.

It will be observed that the effect of the increase in current through the cathode circuit of tube V3 is to impress on the grid of that tube an increased negative voltage opposing the positive noise voltage which brought about the motion of motor 24. This degenerative effect is least when brush 51 is at position A and greatest at position B. The result is that sensitivity of the motor control to a noise voltage change is greatest in the former, and least in the latter case; this is an advantage, since it offsets the lower sensitivity of rectifier circuits at low voltage inputs.

If the noise falls below the level calling for the motion of brush 51 to the position shown in Fig. 2, the result is to reduce the current in the winding of relay R2, increasing that in relay R3 and bringing about a rotation of motor 24 in the reverse direction. This produces an upward movement of brush 51 and a reduction in program gain. To prevent overrun of brush 51 in either direction, end-stop switches 68 and 69 are opened by appropriate cams C1, C2 when brush 51 reaches one or the other extreme position. These cams may be set on the shaft of the motor to open their respective switches according to any desired range of travel of brush 51. As shown in Fig. 2, if clockwise rotation (seen from above) of motor 24 is driving brush 51 downward, switch 68 will presently open when brush 51 reaches position B. Reversal of motor 24 drives brush 51 upward toward position A, where switch 69 will open.

As motor 24 continues to drive downward brush 51, an increasingly larger negative voltage opposes the positive noise voltage at tube V3 until the initial net grid bias is restored. Relay R2 is still operated, however, and the motor continues to turn until the winding current of relay R2 falls to the release value by reason of the continued increase in negative opposing voltage applied by brush 51 to the grid of tube V3. Brush 51 therefore stops with an overshoot, depending on the difference between relay operate and release currents, beyond the ideal position; an accompanying overshoot of brush 11 occurs, due to the motion of shaft 58.

A similar effect in the opposite sense occurs when falling noise level calls for brush 51 to be driven upward. In either case, the activation of motor 24 is slightly delayed beyond the ideal instant, by reason of the increment (of either sign) in noise voltage necessary to change the relay current from operate to release value, or the reverse.

That is to say, in either sense of desired gain connection, the brush position overshoots or leads the ideal while the motor motion lags behind the noise change. Therefore, there is a certain small range of change of the noise voltage which brings about no correction, and this is greater when relay R3 is concerned because resistor 57 is unable to keep perfectly constant the total current supplied to tubes V3 and V4.

Figure 4A:
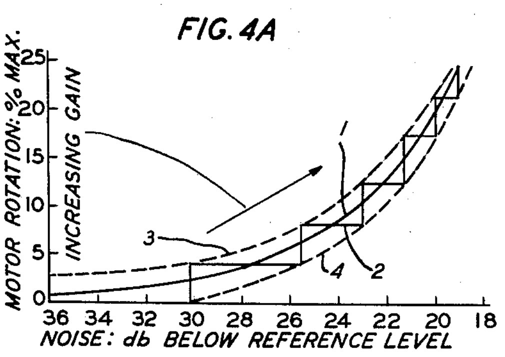
Figs. 4A and 4B illustrate the electrical "backlash" for increasing and for decreasing noise levels, respectively.

Thus, if in Figs. 4A and 4B curve 1 is the ideal characteristic of motor rotation of brush 51 away from position A versus noise level in decibels below a chosen reference level, the case of Fig. 4A is that of rising noise level while that of Fig. 4B corresponds to decreasing noise level. For Fig. 4A, the noise may initially be 36 decibels below the reference level and may rise 6 decibels before relay R2 operates. Thereupon, with no further noise increase, relay R2 operates and motor 24 turns through say 4 per cent of the range allowed. Brush 51 stays at the corresponding point on potentiometer 52 until the noise rises through a new step, this time less than 6 decibels because the numerical voltage change is greater than it had been for the larger step. Motor 24 is now driven to 8 per cent of the maximum range. There results the terraced curve 2, the rise of the steps being the same while the tread is progressively smaller with increasing noise level.

Figure 4B:
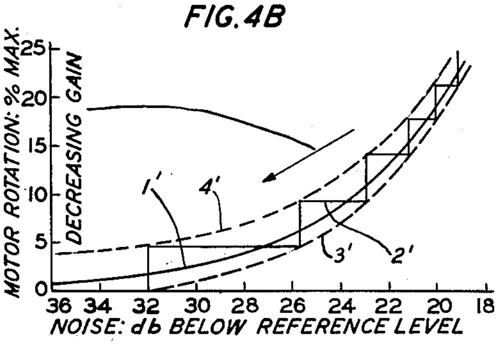

In Fig. 4B, the reverse operation with decreasing noise level results in the terraced curve 2'; here the rise of each step is constant and the same as in Fig. 4A, while the tread increases with decreasing noise level and is at each step greater than for the corresponding step in Fig. 4A, because of the range of noise voltage within which the current in relay R3 does not change from operate to release value.

In Fig. 4A, dashed curves 3 and 4 are the loci of release and of operate instants, respectively, of relay R2.

In Fig. 4B, dashed curves 3' and 4' are similar loci for relay R3. At any noise level, the vertical interval at that abscissa between curves 3 and 4 or 3' and 4' is the electrical "backlash" which is to be rendered harmless. This is done by restricting the operation of motor 24 to curve 3 (the overshoot of increasing program gain) in all cases.

This restriction is brought about by providing a short time constant for the discharge of condenser 40 of Fig. 2. As previously explained, when program rendition begins, sound voltage picked off by amplifier 30 of Fig. 1 from the circuit connection between amplifiers 14 and 15 is rectified and a negative voltage appears on conductor 137, Fig. 2, which cuts off both tubes V2 and V6. Contact 47 opens, disabling the motor control circuits; the voltage of condenser 40 rapidly falls to a value such that, as soon as the program ceases and the control circuits are reestablished, the negative voltage at brush 51 shall begin operation of relay R3 and of motor 24 to drive brush 51 toward the A position on potentiometer 52, regardless of what the noise level shall presently call for. This is analogous to the customary manipulation of a micrometer caliper in measuring the thickness of a specimen.

As condenser 40 recharges in accordance with the noise level in the interval now beginning, brush 51 will be halted by release of relay R3 and presently when R2 operates will be driven in the opposite direction, coming to rest with the overshoot shown in Fig. 4A, in other words, on curve 3. Brush 51 is never further from the A position and so the program gain is never higher than the noise in the no-program interval demands.

In a particular installation of the invention, the circuit of motor 24 was designed to drive the motor through its full range (brush 51 moving from A to B) for an input voltage range of zero to 1.41 volts on the grid of tube V3, Fig. 2. Curve 2 of Fig. 3 shows that in this installation a noise variation of 20 decibels, about, changed the voltage on condenser 40, Fig. 2, from 0.036 volt to 1.41 volts. By adjustment of the brush on potentiometer 42, one may insure that a 30-decibel noise variation is required to change the grid voltage of tube V3 through the stated range (curve 3). In any installation it is thus possible to proportion this grid voltage variation with noise to the range of motor rotation. Such an adjustment provides control of program gain over a range of 30 decibels below a preselected arbitrary level, above which gain increase is not desired; for this adjustment, the brush on potentiometer 35 may also be preset.

The cams on the shaft of motor 24 may be set to open switches 68 and 69 at any desired angular position of the shaft of motor 24. It is desirable to provide for the opening of switch 68 when brush 51 has advanced toward position B far enough to have brought about a desired maximum increase in program gain, thereby establishing a "ceiling" beyond which the program level shall not rise. Likewise, it is necessary to provide for opening switch 69 when brush 51 has returned to position A, to avoid mechanical damage.

Figure 5:
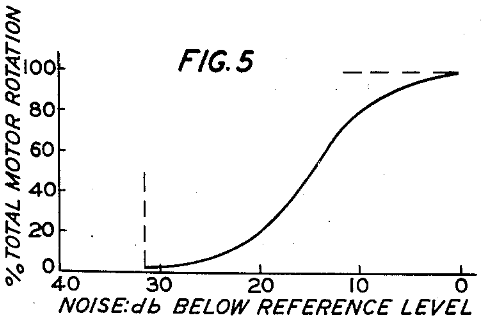
Fig. 5 is the final characteristic of program level increase versus noise level increase for an arbitrary reference level of noise.

Fig. 5 shows the curve of Fig. 3 expressed in terms of motor rotation versus noise level in decibels below a reference level, selected as the highest level of noise at which program gain correction is to be made. At low noise levels a considerable logarithmic change in noise results in a small change in program level. Also noise near the reference level produces a small program change; this is due to the leveling off of curves 2 and 3, Fig. 3. The horizontal dashed line in Fig. 5 reflects the opening of switch 68, Fig. 1, and may be shifted in vertical position by adjustment of the cam opening this switch. The vertical dashed line indicates the noise level at which relay R2 operates.

There remains to be explained the provision for limiting the gain step which may be permitted in any one interval of no program. Referring to Fig. 2, resistor 75 may be of such resistance as to limit the rotary speed of motor 24 in the sense of increasing gain. Assuming relay R2 operated and ground applied via conductor 65 to the front contact of relay R4 and so through resistor 75 to the appropriate stator winding of motor 24, this ground is removed from the motor winding when relay R4 operates and its armature moves to the back contact. The winding of relay R4 is shunted by 50-ohm resistor 71 in series with 3000-microfarad condenser 70. When switch 62 is closed condenser 70 charges up through resistor 71 in series with varistors 72, fixed resistor 73 and rheostat 74 (conveniently, 50 ohms and 60 ohms, respectively) from the secondary of transformer 66. Neglecting the resistance of varistors 72, the winding of relay R4 shunted as described in series with resistors 73 and rheostat 74 forms a voltage divider between the voltage source and ground, and the total resistance between the source and rectifier 72 determines the final voltage to which condenser 70 shall charge. Varying rheostat 74 thus varies the final condenser voltage and so the time required to reach the operate voltage across relay R4. There is thus provided a time delay in the operation of relay R4, a metered interval during which motor 24 is allowed to rotate, at a speed determined by resistor 75, to increase the gain of the program channel. So a limit is placed on the gain change which can be made in any one interval.

Relay R4 with the circuit connections just described constitutes metering circuit 25 of Fig. 1.

Figure 6:
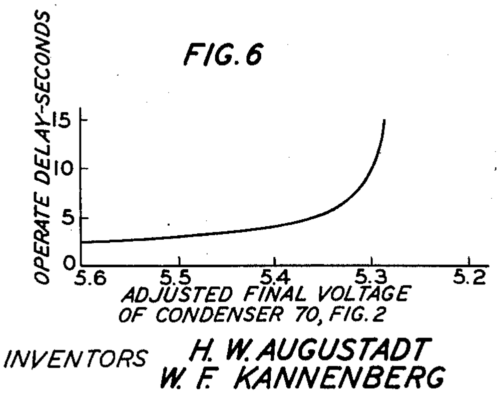
Fig. 6 shows the characteristic of the time delay in the limitation of a step in program gain.

Fig. 6 exhibits the relation between the time delay in operation of relay R4 and the final condenser voltage prescribed by the setting of rheostat 74. In a particular case, varistor 72 comprised two parallel strips each of four one-eighth inch copper oxide discs in series, and the operate voltage of relay R4 was 5.28 volts. The metered interval could in this installation be varied from 2.5 to 15 seconds.

It is convenient so to adjust rheostat 74 that motor 24 shall be limited to making a 3-decibel gain change in a program interval. At the next ensuing program relay R1 releases as earlier described, ground is removed from relay R4 which thereupon releases, and condenser 70 discharges through the relay winding and resistor 71, leaving the program gain fixed at the value set during the preceding interval. In the next interval of no program, a further 3-decibel increase in program gain may be made if called for by the noise in the listening area.

The advantage of so limiting the permissible gain change is that long blasts of noise in an interval are unable to drive the gain so high that, if the noise fell during the program, the sound level would be excessive.

For convenience, motor 24 is drawn as capable of less than 360 degrees rotation. Actually, of course, in a practical apparatus a large internal gear reduction would be used so that cams operating switches 68 and 69 turn slowly and are so set as to permit rotational movement as large as is permitted brush 11 by construction of potentiometer 12 when the selector 49 is set to give full traversal of brush 51 while brush 11 traverses the useful portion of its range. Whereas both 52 and 12 may be commercial circular potentiometers allowing some 270 degrees rotation of their respective brushes, the useful rotation of 12 may be restricted to a small fraction of such range of rotation by the total variation in program gain desired.

While an alternating-current motor is shown in Fig. 2, clearly it is possible to substitute a direct-current motor and omit rectifier 72. Likewise, in numerous cases known equivalents may be used in place of the specific elements described.

What is claimed is:

1. An electrical program reproducing system comprising means for controlling the system gain responsively to the noise level preceding the program and means for disabling the controlling means during program reproduction, said system gain controlling means including a source of unidirectional voltage varying in magnitude with noise level, means responsive to a critical value of said voltage to increase the system gain, a normally released delay-operate relay also responsive to said critical voltage value, whereby said relay operates to disable said gain controlling means a predetermined time after the commencement of a gain increasing operation of said controlling means during any one interval of no program, said relay being subsequently released by operation of said means for disabling the controlling means during program reproduction, and means for controlling the duration of said predetermined time.

2. In an electrical program reproducing system arranged to reproduce sound programs in a noisy listening area alternately with intervals of no program, said system including means for controlling the system gain in response to the noise during an interval of no program and means for disabling the controlling means during the ensuing program reproduction, means for limiting the increase in system gain in response to increase in noise during the interval comprising means for progressively limiting with increase in noise level the rate of increase in system gain, and means for determining the time interval over which a gain increasing operation can take place during any one interval of no program.

3. In an electrical program reproducing system for reproducing sound programs in a noisy listening area alternately with intervals of no program, means for controlling the gain of the system in accordance with the noise level in the area during an interval of no program comprising means for deriving a first unidirectional voltage varying in magnitude with the noise level, means for limiting the rate of increase of said first voltage with increase in noise level, electrically operated means connected to the source of said first voltage and responsive to said first voltage for varying the gain of the system, means for deriving a second unidirectional voltage varying in magnitude with the program level during the ensuing program reproduction, electrically operated means connected to the source of said second voltage and responsive to said second voltage for disabling the gain varying means at the commencement of the program reproduction, said disabling means becoming inoperative at the end of the program reproduction, said gain varying means including adjustable means for limiting the range of gain variation and means for limiting the permissible increase in system gain during any one interval of no program, said last-named means including means for determining the rate of increase in gain responsively to increase of the first unidirectional voltage, and adjustable means for limiting the duration of said gain increase.

4. Means for controlling the sound level reproduced in a noisy listening area by an electrical sound program system of controllable gain comprising means for controlling the gain of the system in accordance with the noise level in the area during the period of no program, means responsive to the presence of program power in the system for disabling the gain controlling means, and means responsive to the initiation of a gain increasing operation by said controlling means during any one period of no program for determining the time interval over which the said gain increasing operation can take place.

5. A system in accordance with claim 4, including means for controlling the duration of said time interval.

6. In an electrical sound program system of variable gain reproducing a sound program in a noisy listening area, means for controlling the gain of the system in accordance with the noise level in the area preceding the program, means responsive to program power in the system for disabling said gain controlling means in the presence of such power, said gain controlling means comprising noise pick-up means, electrical amplifying means controlled by said pick-up means for providing a voltage varying with the noise level, means for deriving from said voltage a variable fractional voltage, motor means for varying simultaneously and oppositely the gain and the fractional voltage, means controlled by the fractional voltage to drive the motor means to vary the fractional voltage in the sense opposite to the variation in noise level, and means operable a predetermined time after the initiation of a gain increasing operation by said motor control means in any period of no program to disable said motor control means.

7. A system in accordance with claim 4, including means for controlling the extent of said predetermined time.

HERBERT W. AUGUSTADT.
WALTER F. KANNENBERG.

References Cited in the file of this patent

UNITED STATES PATENTS

| Number | Name | Date |
|---|---|---|
| 2,457,712 | Olson et al. | Dec. 28, 1948 |
| 2,486,480 | Kimball et al. | Nov. 1, 1949 |
| 2,503,391 | Kannenberg | Apr. 11, 1950 |